(12) United States Patent
Carter et al.

(10) Patent No.: US 7,651,642 B2
(45) Date of Patent: Jan. 26, 2010

(54) STABILIZED POLYORGANOSILOXANE COMPOSITION

(75) Inventors: Randall Lee Carter, Clifton Park, NY (US); Tricia Patrice Silverton, Rosedale, NY (US); Robert J. Berki, Lorain, OH (US)

(73) Assignee: Momentive Performance Materials Inc., Albany, NY (US)

( * ) Notice: Subject to any disclaimer, the term of this patent is extended or adjusted under 35 U.S.C. 154(b) by 538 days.

(21) Appl. No.: 10/797,394

(22) Filed: Mar. 8, 2004

(65) Prior Publication Data
US 2004/0236010 A1  Nov. 25, 2004

Related U.S. Application Data

(63) Continuation-in-part of application No. 09/910,348, filed on Jul. 23, 2001, now abandoned.

(51) Int. Cl.
*F21V 9/06* (2006.01)
*G02B 5/22* (2006.01)

(52) U.S. Cl. .................. 252/589; 252/582; 252/588

(58) Field of Classification Search .............. 252/582, 252/588, 589
See application file for complete search history.

(56) References Cited

U.S. PATENT DOCUMENTS

| | | | |
|---|---|---|---|
| 3,529,035 A | 9/1970 | Lamoreaux et al. | |
| 3,715,232 A | 2/1973 | Audesse | |
| 3,775,452 A | 11/1973 | Karstredy | |
| 3,946,263 A | 3/1976 | Protzeller | |
| 4,429,066 A * | 1/1984 | Gilmer .................. 524/158 |
| 4,455,331 A * | 6/1984 | Barsotti .................. 428/446 |
| 4,801,642 A | 1/1989 | Janik et al. | |
| 4,877,820 A | 10/1989 | Cowan | |
| 4,900,779 A | 2/1990 | Leibfried | |
| 5,008,360 A | 4/1991 | Bard et al. | |
| 5,013,800 A | 5/1991 | Inoue | |
| 5,025,048 A | 6/1991 | Burnier | |
| 5,034,061 A | 7/1991 | Maguire et al. | |
| 5,077,134 A | 12/1991 | Leibfried | |
| 5,118,735 A | 6/1992 | Burnier | |
| 5,158,992 A | 10/1992 | Caselli et al. | |
| 5,180,694 A | 1/1993 | Renlund et al. | |
| 5,350,786 A | 9/1994 | Costanzi et al. | |
| 5,446,113 A | 8/1995 | Lewis | |
| 5,561,179 A | 10/1996 | Borzatta et al. | |
| 5,679,733 A | 10/1997 | Malik et al. | |
| 5,741,552 A * | 4/1998 | Takayama et al. ........ 427/407.1 |
| 5,792,825 A | 8/1998 | Karrer et al. | |
| 5,905,148 A | 5/1999 | Krongauz et al. | |
| 5,990,208 A | 11/1999 | Andrews | |
| 6,013,729 A * | 1/2000 | Tsujimoto et al. ........... 525/105 |
| 6,031,033 A | 2/2000 | Pickett et al. | |

FOREIGN PATENT DOCUMENTS

| EP | 0175333 | 9/1985 |
|---|---|---|
| WO | 9616110 | 11/1995 |
| WO | WO 96/16110 A1 * | 5/1996 |

* cited by examiner

*Primary Examiner*—Timothy J. Kugel
(74) *Attorney, Agent, or Firm*—Dominick G. Vicari

(57) ABSTRACT

A composition comprises a polyorganosiloxane and an admixed hindered amine light stabilizer (HALS) wherein the polyorganosiloxane is free from alternating cyclic hydrocarbon residues. A method of stabilizing a polyorganosiloxane composition comprises providing a polyorganosiloxane and admixing a HALS with the polyorganosiloxane. A light bulb comprises an enclosure coated with a polyorganosiloxane composition containing a HALS.

27 Claims, 1 Drawing Sheet

STABILIZED POLYORGANOSILOXANE COMPOSITION

CROSS-REFERENCE TO RELATED APPLICATIONS

This application is a continuation-in-part of U.S. application Ser. No. 09/910,348, filed Jul. 23, 2001, now abandoned and incorporated by reference herein in its entirety.

BACKGROUND OF THE INVENTION

The present invention relates to a stabilized polyorganosiloxane composition. More particularly, the invention relates to a process of making a coating, a light bulb coated with the coating and a process of applying the coating to a light bulb.

The globe of a light bulb is thin and frail and is vulnerable to breaking on impact. Additionally, some recent bulb designs include an inner filament tube under positive pressure. The filament tube can rupture and shatter an outer globe. The bulb can be coated on the outside with an elastomeric polyorganosiloxane coating to improve impact resistance and to prevent scattering of glass shards in the event the bulb does break. A polyorganosiloxane coating advantageously combines high impact strength, transparency, colorlessness and low cost. However, most polyorganosiloxane coatings lack thermal stability above 180° C. This severely restricts effective service life of polyorganosiloxane coated bulbs, which typically encounter operating temperatures well in excess of 180° C. While iron oxide or copper containing compounds can be added as thermal stabilizers, these compounds impart significant opacity and/or color to the bulb coating.

There is a continuing need for a heat stabilizer for a polyorganosiloxane to coat a bulb that will extend service temperature and composition life and will preserve the transparent and colorless characteristics of an uncoated bulb.

BRIEF SUMMARY OF THE INVENTION

According to the present invention, a polyorganosiloxane is admixed with a hindered amine light stabilizer (HALS), or modified HALS, to form a stable composition having improved performance at elevated temperatures and significantly prolonged life without adversely affecting light transmitting properties. The composition comprises a polyorganosiloxane and an admixed hindered amine light stabilizer (HALS) wherein the polyorganosiloxane is free from alternating cyclic hydrocarbon residues.

The present invention also relates to a method of stabilizing a polyorganosiloxane composition, comprising providing a polyorganosiloxane and admixing a HALS with the polyorganosiloxane and to a light bulb, comprising an enclosure and a coating for the enclosure, the coating comprising a polyorganosiloxane composition containing a HALS.

DETAILED DESCRIPTION OF THE INVENTION

Figure 1:
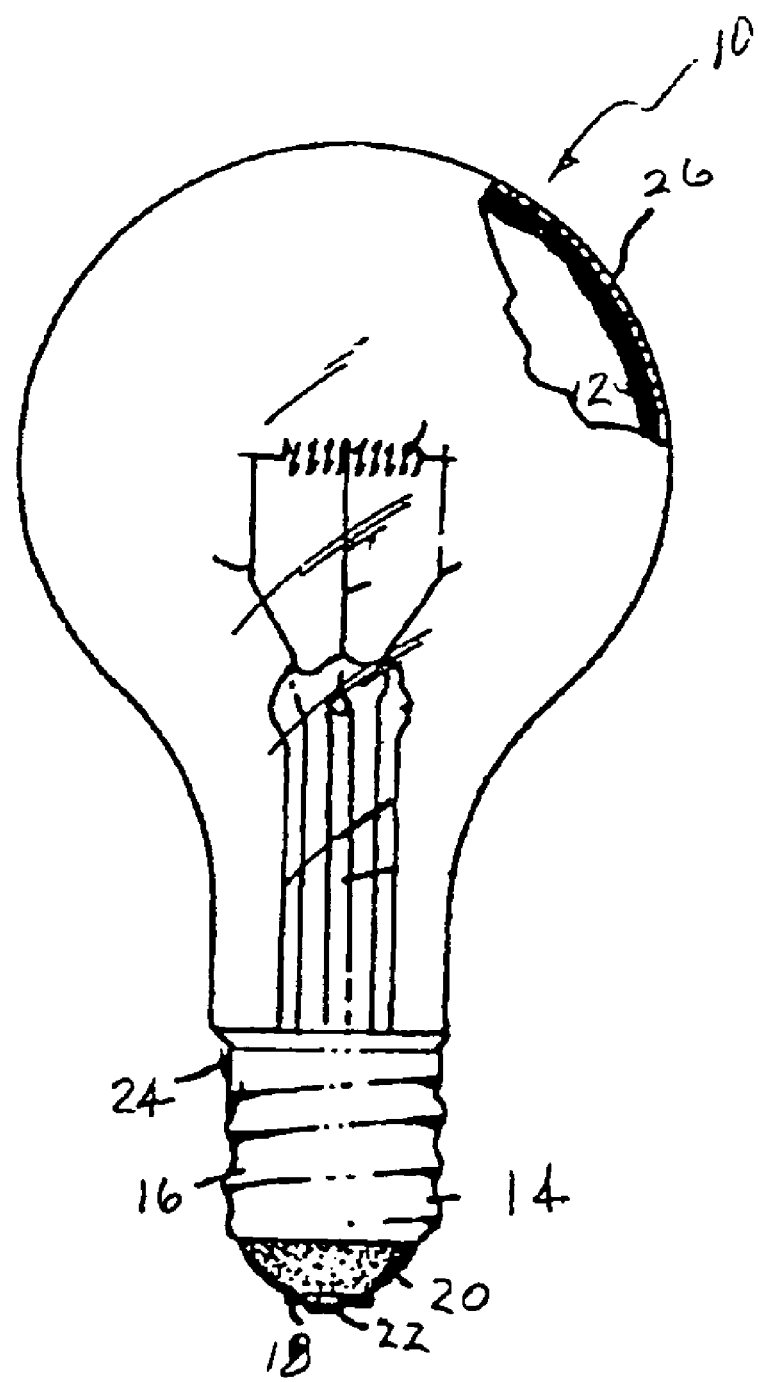
FIG. 1 is a schematic representation of a coated light bulb.

Historically, HALS were not suggested for use with silicones because of concern that amines will poison a cure catalyst and thus inhibit the crosslinking reaction. Additionally, it has been believed that nonoxidative cycloreversion rather than oxidation is the predominant mode of polyorganosiloxane degradation at elevated temperatures. A HALS is an antioxidant. Cycloreversion is not influenced by oxygen. Hence, it has been believed that antioxidant HALS would be ineffective with polyorganosiloxanes.

Surprisingly, it has been found in accordance with the present invention that organopolysiloxane compositions can be stabilized with a HALS, or a modified HALS. While applicants do not intend to be bound by the following explanation, it is believed that both cycloreversion and oxidation occur simultaneously at elevated temperatures. However, oxidation appears to be a predominate mechanism at temperatures greater than 185° C. in an atmosphere containing oxygen. These conditions are the usual conditions for use of polyorganosiloxanes as a bulb coating.

According to the invention, the composition comprises (1) a sterically hindered amine light stabilizer (HALS), or modified HALS such as a polyorganosiloxane modified HALS, and (2) polyorganosiloxane, wherein the polyorganosiloxane is free from alternating cyclic hydrocarbon residues. The composition can comprise HALS, or modified HALS, in a range between about 0.05 weight % and about 10 weight % of the total composition. Desirably, the composition comprises HALS in a range between about 0.1 weight % and about 5 weight % and preferably about 0.25 weight % and about 1 weight % of the total composition.

Preferably, the polyorganosiloxane is a methyl silicone composition. The polyorganosiloxane of the composition can consist of blocks of the general formula $[(CH_3)_2SiO]$. The polymer chain can end with a trimethylsiloxane unit $[(CH_3)_3SiO_{0.5}]$. The trimethylsiloxane unit can be employed within a range between about 0.7 mol % and about 6.0 mol % of the total polyorganosiloxane, typically in a range between about 2.0 mol % and about 5.5 mol % and is more typically employed in a range between about 2.5 mol % and about 5 mol % of the polymer. The polyorganosiloxane may contain branches and can be formed by crosslinking a vinyl containing organosiloxane fluid with a crosslinker.

The organosiloxane fluid of the present invention can be a vinyl containing linear or branched (non-cyclic) polyorganosiloxane, which is cured with an organohydrogensiloxane crosslinker in the presence of a platinum catalyst to form an elastomeric material. Vinylsiloxane fluids that can be used can contain vinylsiloxy units in a range between about 0.05 mol % and about 3.5 mol %, typically in a range between about 0.1 mol % and about 3 mol % and more typically in a range between about 0.14 mol % and about 2 mol % based on the total moles of condensed organosiloxy units in the vinylsiloxane.

The preferred vinylsiloxane fluid can be represented by the following formula:

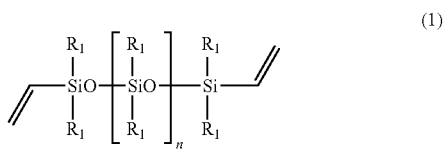

(1)

where n is a positive integer of sufficient value to provide a viscosity in a range between about 100 centipoise and about 200,000 centipoise at 25° C., typically in a range between about 3,000 centipoise and about 10,000 centipoise, and more typically in a range between about 4,000 centipoise and about 5,000 centipoise at 25° C. Each $R_1$ is a monovalent hydrocarbon radical selected from the group consisting of alkyl radicals, aryl radicals, aralkyl radicals, alkenyl radicals, cycloaliphatic radicals, halogenated derivatives of the above radicals and cyanoalkyl radicals. Preferably $R_1$ is an alkyl radical with carbon atoms in a range between 1 and 8.

The quantity of organohydrogensiloxane crosslinker employed can be sufficient to provide chemically combined hydrogen attached to silicon (SiH) in a range between about 0.2 moles and about 5.0 moles per mole of vinyl-siloxane functionality (Si-vinyl). Typically the composition can comprise SiH in a range between about 0.75 moles and about 2.5 moles per mole of Si-vinyl and more typically, SiH in a range between about 1.0 moles and about 1.5 moles per mole of Si-vinyl. Two forms of suitable crosslinkers are shown below in formulas (2) and (3):

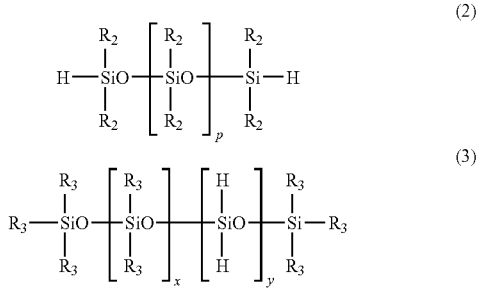

where p is a positive integer of sufficient value to provide a viscosity in a range between about 1 centipoise and about 500 centipoise, typically in a range between about 2 centipoise and about 100 centipoise and more typically in a range between about 5 centipoise and about 10 centipoise at 25° C. In formula (3), x and y are positive integers of a value to provide a viscosity in a range between about 1 centipoise and about 1,000 centipoise, typically in a range between about 2 centipoise and about 100 centipoise and more typically in a range between about 5 centipoise and about 10 centipoise at 25° C.

The organohydrogensiloxane crosslinker may also include resins having the following units:

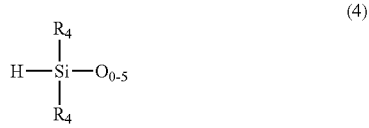

chemically combined with $SiO_2$ where the ratio of $(R_4+H)$ to Si varies in a range between about 1.0 and about 2.7, typically in a range between about 1.2 and about 2 and more typically in a range between about 1.5 and about 1.7.

In formulas (2), (3) and (4), $R_2$, $R_3$ and $R_4$ represent monovalent hydrocarbon radicals free of olefinic unsaturation selected from the group consisting of an alkyl radical, aryl radical, aralkyl radical, a halogenated derivative of the radicals, and a cyanoalkyl radical. Preferably $R_2$, $R_3$ and $R_4$ are alkyl radicals with carbon atoms in a range between 1 and 13. The substituents $R_2$, $R_3$ and $R_4$ can be the same or chemically different radicals.

A platinum catalyst employed in the present invention includes all of the well-known platinum catalysts that are effective for catalyzing a reaction between silicon-bonded hydrogen and vinyl groups. These catalysts include the chloroplatinic acid catalyst described in Speier et al., U.S. Pat. No. 2,823,218 and reaction products of a chloroplatinic acid and an organosilicone compound such as those described by Willing, U.S. Pat. No. 3,419,593. Also applicable are the platinum hydrocarbon complexes shown by Ashby U.S. Pats. 3,159,601, and 3,159,662, the platinum acetyl acetonate shown by Baney, U.S. Pat. No. 3,723,497 and the platinum alcoholate catalysts described by Lamoreaux, U.S. Pat. No. 3,220,972. The preferred platinum catalyst is shown by Karstedt, U.S. Pat. No. 3,775,452, which is formed by reacting chloroplatinic acid with tetramethyldivinyldisiloxane in the presence of sodium bicarbonate in ethanol.

The polyorganosiloxane is a heat curable composition. The HALS, or modified HALS may be admixed prior to curing or subsequent to curing to form the composition of the present invention. When the HALS is admixed with the polyorganosiloxane subsequent to curing, the HALS is dispersed in a solvent and the polyorganosiloxane is swelled with the solvent containing the dispersed HALS. Exemplary solvents include toluene or xylenes. Cure of the heat curable compositions of the present invention, can be achieved at a temperature in a range between about 80° C. and about 250° C.

Reinforcing filler can be incorporated into the heat curable organopolysiloxane composition provided by the process of the present invention. The composition can comprise filler in a range between about 5 parts by weight and about 100 parts by weight based on 100 parts by weight of the vinylsiloxane fluid. Typically, the composition has less than 50 parts by weight of filler per 100 parts by weight of the vinyl siloxane fluid. The filler can be selected from fumed silica, precipitated silica and mixtures thereof. Extending filler can be utilized in place of some of the reinforcing filler. The extending filler increases to some extent the tensile strength of the compositions while not unduly increasing viscosity of the composition in the uncured state. The extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, synthetic fibers and so forth.

Suitable HALS in this invention include, but are not limited to, the stabilizers disclosed by Costanzi et al., U.S. Pat. No. 5,350,786. The HALS is constituted by one or more derivatives of tetra-alkyl-morpholine (5) and of tetra-alkyl-pyrrolidine (6), respectively:

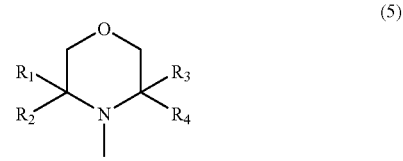

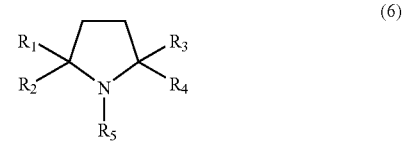

or by one or more derivatives of tetra-alkyl-piperidine (7) or tetra-alkyl-piperazinone (8):

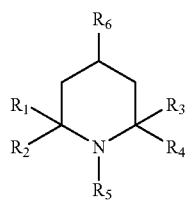

(7)

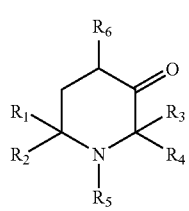

(8)

wherein $R^1$ and $R^2$ independently represent $C_{1-18}$ haloalkyl, $C_{1-18}$ alkyl, $C_{5-18}$ cycloalkyl, $C_{2-18}$ alkenyl, or unsubstituted $C_{7-18}$ aralkyl; or $R^1$ and $R^2$, when taken together with the carbon to which they are attached, form a $C_{4-12}$ alicyclic ring; $R^3$ and $R^4$ are independently $C_{1-18}$ haloalkyl, $C_{1-18}$ alkyl, $C_{2-18}$ alkenyl, or unsubstituted $C_{7-18}$ aralkyl; or $R^3$ and $R^4$ when taken together with the carbon atom to which they are attached, form a $C_{4-12}$ alicyclic ring. $R^5$ and $R^6$ are independently $C_{1-24}$ alkyl, hydrogen, acyl, benzyl, $C_{1-12}$ haloalkyl, $C_{2-14}$ alkenyl, unsubstituted $C_{7-14}$ aralkyl, alkoxy or carboalkoxy; $R^5$ optionally also represents oxygen.

By the term "modified HALS" or "derivatives of tetra-alkyl-piperidine," also those compounds are meant which have a different nomenclature, but which contain in their structure at least a tetra-alkyl-piperdinic group (II) as the chemically active group, such as a polyorganosiloxane modified HALS. As one of ordinary skill in the art will appreciate, the HALS may also be modified with additional moieties to control physical properties such as solubility and boiling point.

To stabilize the present composition, and as a preferred component of the present composition, the HALS is modified with a first polyorganosiloxane prior to mixing with a second polyorganosiloxane to form a stabilized composition. Preferred polyorganosiloxane modified HALS are represented by:

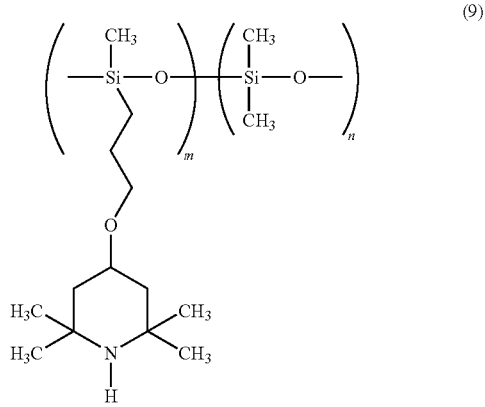

(9)

where n may be 0 or any integer, and m represents an integer greater than 3. The methylsiloxane moieties (m and n) may form a cyclic ring such as the cyclic tetramer where m=4 and n=0 or the octamer (m=8, n=0) or the methylsiloxane moieties (m and n) may form a linear chain with trimethylsiloxane end groups. Representatives from this class of HALS can be obtained from Great Lakes Chemical Company under the trade name Uvasil™ 299 LM or Uvasil™ 299 HM.

The composition of the present invention can be used in any application that requires a light-or heat-stabilized polyorganosiloxane coating. Specific applications include a silicone coating used to provide impact resistance to a light bulb or to contain explosive failures of an inner halogen filament tube of a Halogen A-line bulb. Exemplary bulbs include incandescent bulbs, tungsten-halogen bulbs, and arc discharge bulbs. FIG. 1 illustrates an embodiment of the present invention. FIG. 1 shows a glass light bulb 10 that includes enclosure 12 and screw base 14. The enclosure 12 is shown as a globe but can be any lighting element such as a globe, tube or the like. The composition may be applied to the interior, exterior, or both the interior and exterior of the enclosure. Base 14 includes threaded metal shell 16 and eyelet contact 18. Glass piece 20 supports the eyelet contact 18 and insulates it from the metal shell 16. Lead-in wires are inside the base and are not shown. The lead-in wires terminated in solder drops 22 and 24, which affix the drops 22 and 24 to base contacts, one lead-in wire to each contact.

Globe 12 is an enclosing glass envelope that has a transparent coating 26 comprising an impact resistant silicone according to the invention. The globe 12 is coated with the composition of this invention by spraying or otherwise flowing the composition onto the globe 12 or by dipping the globe 12 into the composition.

Dip coating is a typical method for applying a coating according to the present invention. In this method, the entire globe 12 and a slight portion of the metal socket can be immersed into a coating bath containing an uncured organosiloxane composition and any appropriate solvent, such as toluene or xylenes, necessary to adjust the viscosity to a range between about 3,000 and about 5,500 centipoise at 25° C. The bulb is slowly withdrawn from the bath over a period of approximately 2 minutes. Then the bulb is held in the upright (base-down) position for approximately 40 seconds. The bulb is then placed in a flash oven with a linear air flow rate of at least 500 feet per minute of for approximately 4 minutes at 65° C. to assist in removal of the solvent. Multiple coatings can be applied in this manner to achieve a desired thickness. The resulting siloxane coating is then cured by treatment at 100° C. for approximately 4 minutes followed by treatment at a temperature in a range between about 170° C. and about 200° C. for 4 minutes. The times and temperatures of the coating protocol may be varied depending on the specific silicone formulation.

The coating of the present invention can be of any thickness. However, the thickness should be in a range between about 0.001 inches and about 0.030 inches to provide shatter-resistant characteristics. A typically thickness is in a range between about 0.010 inches and about 0.020 inches and a more typical thickness is in a range between about 0.012 inches and about 0.018 inches.

The following Examples are illustrative and should not be construed as a limitation on the scope of the claims unless a limitation is specifically recited. The examples utilized Uvasil™ 299 (obtained from Great Lakes Chemical Corp.), a HALS that contains a pendant siloxane chain. Uvasil™ 299 is a preferred HALS since its siloxane functionality enhances miscibility of the HALS with the polyorganosiloxane.

EXAMPLE

Uvasil™ 299HM and Uvasil™ 299LM (designated by Great Lakes Chemical Company to indicate high and low molecular weight analogs respectively) were added at 0.5 weight % to two different polymethylsiloxane formulations—SLE5700 from GE Silicones and Q1040R obtained from Quantum Silicones. The compositions were cast into thin films and cured by heating at 90° C. for 30 minutes, followed by heating at 150° C. for 30 minutes and 175° C. for 30 minutes. Swell index, yellowness index, and haze of the cured samples are shown in TABLE 2.

TABLE 2

|  | SLE 5700 | | | Q1040R | | |
| --- | --- | --- | --- | --- | --- | --- |
|  | Control | 0.5% 299LM | 0.5% 299HM | Control | 0.5% 299LM | 0.5% 29HM |
| Swell | 109.5% | 134.3% | 126.8% | 130% | 118.2% | 127.3% |
| YI | 0.3 | 0.5 | 0.5 | 1.0 | 1.0 | 1.1 |
| Haze | 11 | 8 | 13 | 11 | 8 | 12 |

Yellowness Index (YI) was recorded as per ASTM-D1925 on a MACBETH COLOREYE® 7000A colorimeter. Haze was recorded on a BYK GARDNER® Haze-Guard instrument.

The addition of HALS did not affect the cure of Q1040R as evidenced by the similarity of the swell index. The swell index of HALS-containing SLE5700 was higher than the control indicating a lower crosslink density, however, no difference in tackiness or elasticity was qualitatively apparent. Uvasil™ 299 HALS appeared to be significantly miscible in both silicones based on the similarity of the haze data. Furthermore the HALS did not have a detrimental effect on the color of the cured silicones as indicated by the yellowness index.

Sheets of the SLE 5700 in TABLE 2 were subjected to aging in an air oven at 230° C. Swell index results are shown in TABLE 3 for the control formulation and the formulations containing 0.5 wt % of HALS. Relative change in swell index is indicated in parentheses. These data clearly demonstrate that the HALS are effective at stabilizing the degradation of methylsiloxanes as evidence by the slower decrease in swell index upon aging.

TABLE 3

| Aging Time (days) | SLE 5700 Control | SLE 5700 Uvasil ™ 299 LM | SLE 5700 Uvasil ™ 299 HM |
| --- | --- | --- | --- |
| 0 | 109% (0) | 134% (0) | 127% (0) |
| 3 | 82% (Δ25%) | — | — |
| 7 | — | 115% (Δ14%) | 117% (Δ8%) |
| 14 | 66% (Δ39%) | 105% (Δ22%) | 106% (Δ17%) |

While preferred embodiments of the invention have been described, the present invention is capable of variation and modification and therefore should not be limited to precise details of examples. For example, the HALS, or modified HALS can be admixed with the polyorganosiloxane after the cure via surface impregnation or the like. In this embodiment, the HALS is dispersed in a solvent and the cured polyorganosiloxane is soaked in the dispersion. After the silicone is swelled by the HALS solution, the lower boiling solvent is removed by heat and/or vacuum leaving the HALS entrapped within the polyorganosiloxane matrix.

The invention includes changes and alterations that fall within the purview of the following claims.

What is claimed is:

1. A composition consisting essentially of an elastomeric polyorganosiloxane which is a siloxane crosslinked by an organohydrogensiloxane crosslinker and which is free from alternating cyclic hydrocarbon residues, and an admixed sterically hindered amine light stabilizer which includes a pendant siloxane chain.

2. The composition of claim 1, wherein said hindered amine light stabilizer comprising a methylsiloxane moiety and is represented by the formula

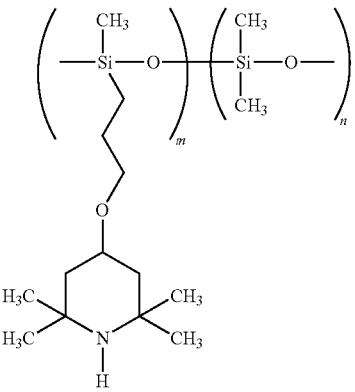

where n is 0 or any integer, and m represents an integer greater than 3.

3. The composition of claim 2, wherein the methylsiloxane moiety forms a cyclic ring.

4. The composition of claim 3, wherein the methylsiloxane moiety forms a cyclic tetramer where m=4 and n=0 or forms and octamer where m=8 and n=0.

5. The composition of claim 3, wherein the methylsiloxane moiety forms a linear chain with trimethylsiloxane end groups.

6. The composition of claim 1, wherein said polyorganosiloxane is a reaction product of a non-cyclic, vinylsiloxane fluid and an organohydrogensiloxane crosslinker in a ratio to provide SiH in an amount in a range of from about 0.2 moles to about 5.0 moles per mole of vinyl-siloxane functionality.

7. The composition of claim 6, wherein said vinylsiloxane fluid comprises vinylsiloxy units in an amount in a range of from about 0.05 mol% to about 3.5 mol% based on the total moles of condensed organosiloxy units in the vinylsiloxane.

8. The composition of claim 6, wherein said vinylsiloxane fluid comprises:

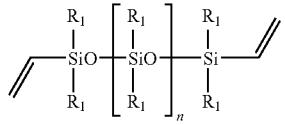

where n is a positive integer having a value such that a viscosity of the composition in a range between about 100 centipoise and about 200,00 centipoise at 25° C., and each $R_1$ is an alkyl radical having an amount of carbon atoms in a range of from 1 to 8.

9. The composition of claim 6, wherein said organohydrogensiloxane crosslinker comprises chemically combined hydrogen attached to silicon in an amount in a range of from about 0.2 moles to about 5.0 moles per mole of vinyl-siloxane functionality.

10. The composition of claim 6, wherein said organohydrogensiloxane crosslinker comprises (2) or (3):

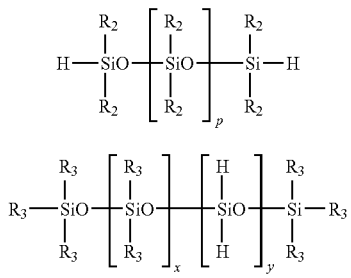

where p is a positive integer of a value to provide a viscosity in a range of from about 1 centipoise to about 1,000 centipoise at 25° C., x and y are positive integers of sufficient value to provide a viscosity in a range of from about 1 centipoise to about 1,000 centipoise at 25° C., and wherein $R_2$ and $R_3$ represent the same or different monovalent hydrocarbon radicals free of olefinic unsaturation and is selected from the group consisting of alkyl radical, aryl radical, aralkyl radical, halogenated derivative of said radicals and a cyanoalkyl radical.

11. The composition of claim 6, wherein said organohydrogensiloxane crosslinker comprises the units:

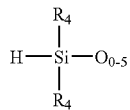

chemically combined with $SiO_2$ where the ratio of $(R_4+H)$ to Si is in a range of from about 1.0 to about 2.7, wherein $R_4$ represents the same or different monovalent hydrocarbon radical free of olefinic unsaturation and is selected from the group consisting of an alkyl radical having from 1 to 13 carbon atoms, an aryl radical, aralkyl radical, halogenated derivatives of said radicals and a cyanoalkyl radical.

12. The composition of claim 1, wherein said polyorganosiloxane is a reaction product of a curable composition comprising a noncyclic, vinylsiloxane fluid, an organohydrogensiloxane crosslinker and a filler in an amount in a range of from about 5 to about 100 parts by weight based on 100 parts by weight of the vinylsiloxane fluid.

13. The composition of claim 12, wherein said filler is selected from the group consisting of fumed silica, precipitated silica and mixtures thereof.

14. The composition of claim 12, wherein said curable composition comprises less than 50 parts by weight of filler per 100 parts by weight of the vinylsiloxane fluid.

15. The composition of claim 12, wherein said curable composition comprises an extending or reinforcing filler selected from the group consisting of titanium dioxide, lithopone, zinc oxide, zirconium silicate, silica aerogel, iron oxide, diatomaceous earth, calcium carbonate, silazane treated silicas, glass fiber, magnesium oxide, chromic oxide, zirconium oxide, aluminum oxide, alpha quartz, calcined clay, carbon, graphite and synthetic fiber.

16. The composition of claim 1, wherein said polyorganosiloxane comprises $((CH_3)_3SiO_{0.5})$ units in an amount in a range of from about 0.7 mol% to about 6.0 mol%.

17. The composition of claim 1, comprising said hindered amine light stabilizer in a range of from about 0.05 weight % to about 10 weight %.

18. A method for making the composition of claim 1 comprising the steps of:
(a) reacting a vinylsiloxane with an organohydrogensiloxane crosslinker to provide a polyorganosiloxane,
(b) admixing a sterically hindered amine light stabilizer to the polyorganosiloxane, wherein said sterically hindered amine light stabilizer has a pendant siloxane chain;
(c) curing the polyorganosiloxane prior to or after the step (b) of admixing the sterically hindered amine light stabilizer to provide an elstomeric transparent silicone.

19. The method of claim 18 wherein the curing step (c) is performed by heating in air.

20. The method of claim 19 wherein said heating is at a temperature of from about 170° C. to about 200° C. for a period of time sufficient to effect curing.

21. The method of claim 18 wherein the polyorganosiloxane is cured before admixing the sterically hindered amine light stabilizer, wherein said sterically hindered amine light stabilizer is dispersed in a solvent and the cured polyorganosiloxane is swelled with the solvent containing the sterically hindered amine light stabilizer.

22. A method for making the composition of claim 1 comprising the steps of:
a. reacting a vinylsiloxane with an organohydrogensiloxane to provide a curable polyorganosiloxane;
b. admixing a sterically hindered amine light stabilizer having a pendant siloxane chain to the curable polyorganosiloxane to provide a heat curable silicone fluid;
c. applying the heat curable silicone fluid to a substrate; and
d. curing the heat curable silicone fluid to provide an elastomeric coating on the substrate.

23. The method of claim 22 wherein curing the heat curable silicone fluid comprises heating the silicone fluid in air.

24. The method of claim 23 wherein the heating is performed at a temperature of from about 170° C. to about 200° C. for a period of time sufficient to effect caring.

25. The method of claim 22 wherein the substrate is a light bulb.

26. The method of claim 25 wherein the step (c) of applying the heat curable silicone fluid comprises spraying the fluid on an interior surface of the light bulb.

27. The method of claim 25 wherein the step (c) of applying the heat curable silicone fluid comprises dip coating the fluid.

* * * * *